United States Patent [19]

Schmitz

[11] Patent Number: 4,511,832
[45] Date of Patent: Apr. 16, 1985

[54] STEPPER MOTOR DOOR CONTROL APPARATUS AND METHOD

[75] Inventor: William E. Schmitz, Pittsburgh, Pa.

[73] Assignee: Westinghouse Electric Corp., Pittsburgh, Pa.

[21] Appl. No.: 590,109

[22] Filed: Mar. 19, 1984

[51] Int. Cl.³ .............................................. H02K 29/04
[52] U.S. Cl. .................................... 318/685; 318/696; 83/369
[58] Field of Search ................. 318/685, 696; 83/369; 187/29 R

[56] References Cited

U.S. PATENT DOCUMENTS 4,106,685  8/1978  Strunc et al. ......................... 226/136

Primary Examiner—S. J. Witkowski
Assistant Examiner—Saul M. Bergmann
Attorney, Agent, or Firm—R. G. Brodahl

[57] ABSTRACT

A door movement control apparatus and method are provided for opening and closing door apparatus with a stepper motor supplied control pulses in response to a command signal indicating the desired movement direction. A table of time delays for the respective control pulses and resulting motor steps provides a desired speed pattern for the door movement. A comparison of the number of motor steps taken with the number of control pulses provided is made to determine when a closing door is obstructed.

8 Claims, 17 Drawing Figures

| STEP | SW1 | SW2 | SW3 | SW4 |
|---|---|---|---|---|
| 1 | ON | OFF | ON | OFF |
| 2 | OFF | ON | ON | OFF |
| 3 | OFF | ON | OFF | ON |
| 4 | ON | OFF | OFF | ON |
| 1 | ON | OFF | ON | OFF |

STEPPER MOTOR DOOR CONTROL APPARATUS AND METHOD

CROSS REFERENCE TO RELATED APPLICATIONS

The present application is related to a patent application Ser. No. 500,217 filed 06-02-83 by W. E. Schmitz and entitled PROPULSION CONTROL APPARATUS FOR PASSENGER VEHICLES, which is now issued as U.S. Pat. No. 4,458,185 and is related to a patent application Ser. No. 590,108 filed concurrently herewith by W. E. Schmitz and entitled STEPPER MOTOR TORQUE CONTROL APPARATUS AND METHOD, which are assigned to the same assignee and the disclosures of which are incorporated herein by reference.

BACKGROUND OF THE INVENTION

A stepper motor is a rotary motion apparatus which provides desired incremental angular rotation of a load in response to sequential input control pulses and will provide the desired angular movement of that load coupled with the motor in response to each pulse until the required load torque exceeds the electromagnetic capability of the motor.

A typical stepper motor as presently available in the open market is made and sold by Superior Electric Company of Bristol, Conn. as their Model M112FJ12. To provide a control apparatus, which can include a programmed microprocessor, operative to sequentially energize the stepper motor stator coils with the required control pulses to obtain a given angular speed, including accelerating and decelerating below the torque limits of the stepper motor, is well known in the prior art.

It is known in the prior art to provide a motor for opening and closing the passenger doors on a transit vehicle in response to door command signals from a vehicle automatic train operation control apparatus, as described in an article entitled Recent Applications of Microprocessor Technology to People Mover Systems by M. P. McDonald et al. and published in the proceedings for the 29th IEEE Vehicle Technology Group Conference held in Chicago, Ill. during March, 1979.

SUMMARY OF THE INVENTION

A control apparatus and method are provided for opening and closing passenger doors with a stepper motor in response to a door command signal.

A microprocessor apparatus responds to the input door command signal for providing control pulses to step the motor, with the time duration of each control pulse being determined by a predetermined time delay pattern to determine the operating speed of the door movement for opening or closing of the passenger doors in relation to a desired speed profile. Longer control pulses supplied to the motor will slow down the motor speed, as compared with shorter control pulses, and control the coupled movement of the vehicle door or other desired load.

DESCRIPTION OF A PREFERRED EMBODIMENT

Figure 1:
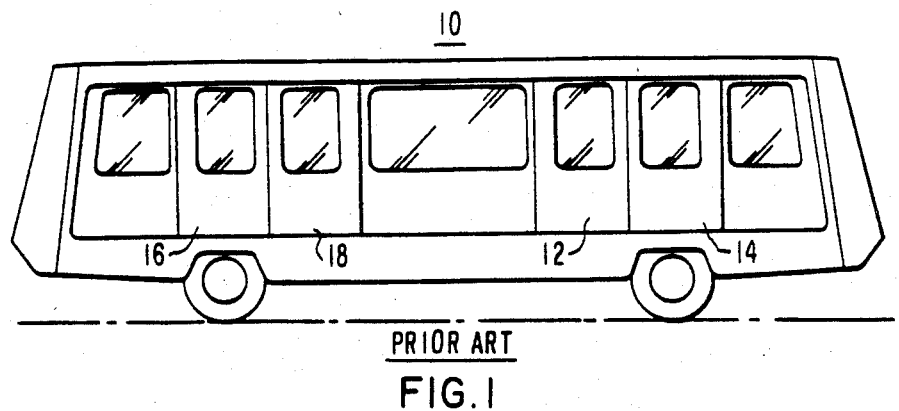
FIG. 1 shows a side view of a prior art transit vehicle including passenger doors in a closed position.

In FIG. 1 there is shown a prior art transit vehicle 10 including a first pair of closed passenger doors 12 and 14 and a second pair of closed passenger doors 16 and 18.

Figure 2:
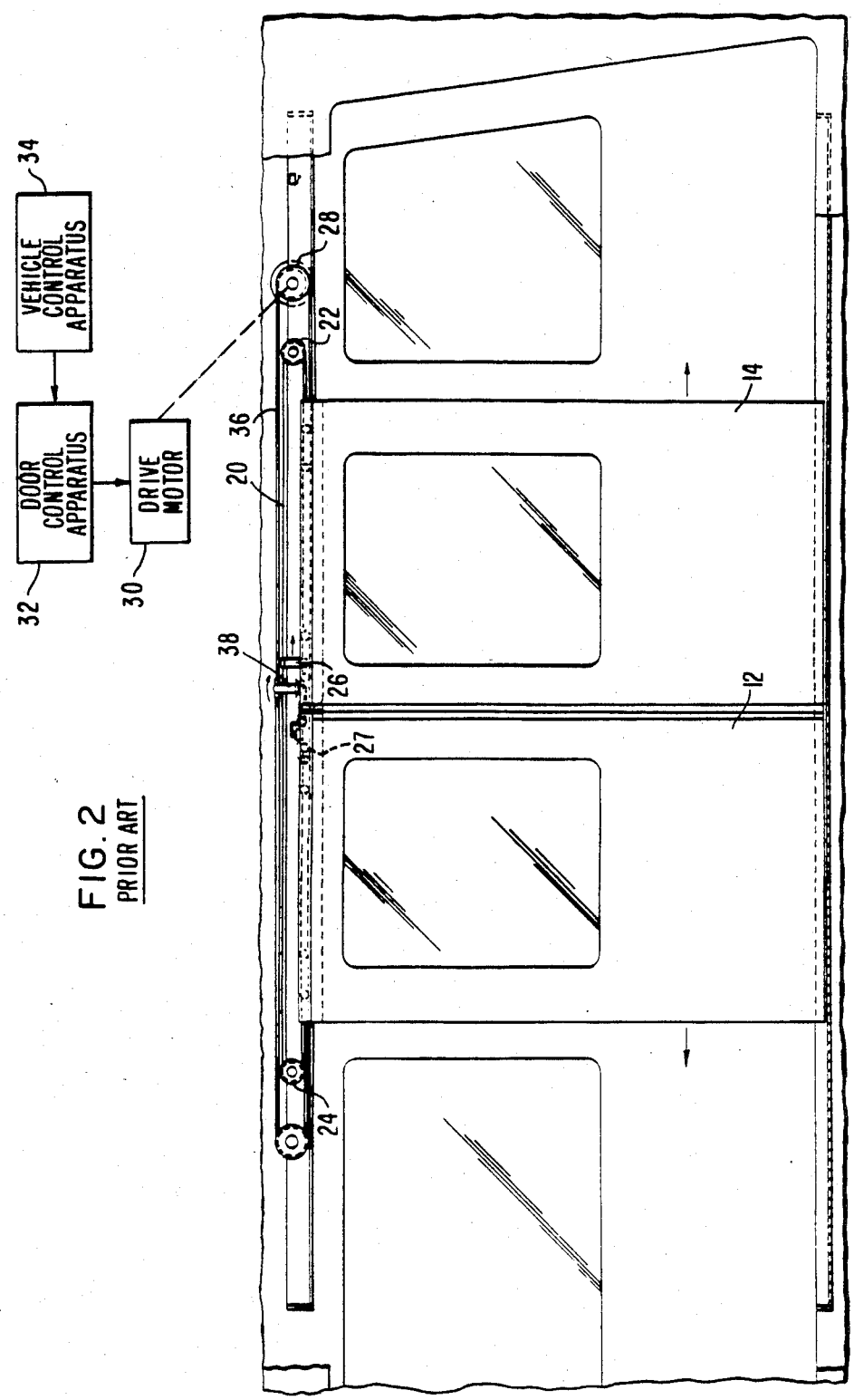
FIG. 2 shows a prior art direct or alternating current motor coupled to operate a pair of biparting passenger doors of a transit vehicle.

In FIG. 2 there are shown the prior art passenger doors 12 and 14 operative with a connecting drive cable 20 that is looped around an idler pulley 22 and a similar idler pulley 24 and connected through fasteners 26 to move the passenger door 14 and is connected to passenger door 12 through fastener 27 to move the passenger door 12 such that in this way the passenger doors 12 and 14 can be opened or can be closed together, as described in U.S. Pat. No. 4,142,326 of W. E. Schmitz. A drive pulley 28 is coupled with a drive motor 30 and operated by a suitable control apparatus 32 in response to door open and door closed input control signals from a well known vehicle control apparatus 34. A drive belt member 36 is connected through the drive arm 38 for applying a door movement and door unlatching force to the passenger door 14. The drive belt 36 provides a linear translation force to move the door 14 through its desired travel to the right for the purpose of separating or opening the passenger doors 12 and 14. The same force that moves the door 14 open and closed also unlocks and locks the lock mechanism coupled with the drive arm 38. When the motor 30 is not energized and the passenger doors 12 and 14 are closed, the doors 12 and 14 cannot be opened by applying an opening force directly to either door 12 or 14. However, when the door opening force is applied by the drive member 38 to the lock mechanism, the latter will unlock and the door 14 will move to the right while the door 12 will move to the left in conjunction with the movement of the door 14.

Figures 3, 4:
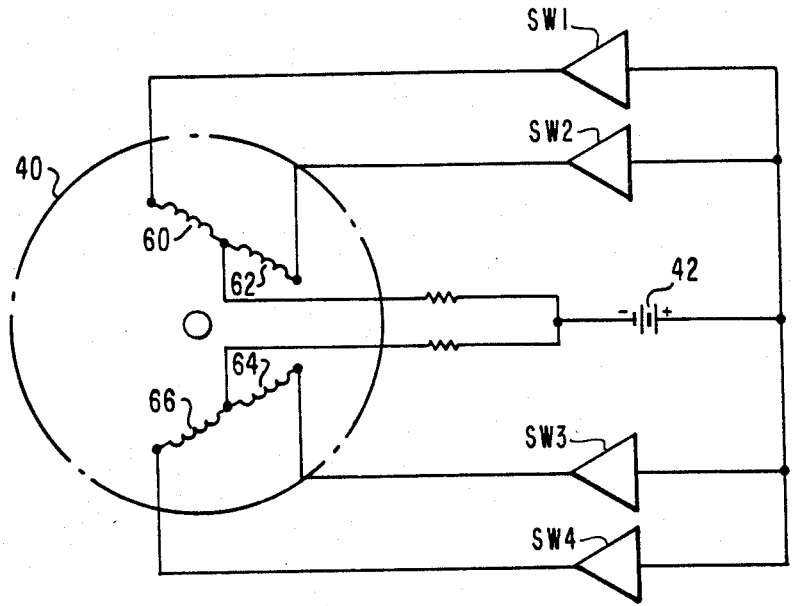
FIG. 3 shows a prior art phase-switched DC energization control apparatus for a four-pole stepper motor.
FIG. 4 shows the prior art control signal input sequence for providing clockwise rotation of the stepper motor shown in FIG. 3.

In FIG. 3 there is shown a prior art phase-switched DC energization circuit for a four-pole stepper motor 40. The switch SW1 when closed connects the stator winding 60 across the voltage source 42. The switch SW2 when closed connects the stator winding 62 across the voltage source 42. When the switch SW3 is closed, the stator winding 64 is connected across the voltage source 42. When the switch SW4 is closed, the stator winding 66 is connected across the voltage source 42.

In FIG. 4 there is shown a prior art four step input control pulse sequence for providing clockwise rotation of the motor 40. To reverse the motor 40, the switching steps are provided from bottom to top as shown in FIG. 4.

Figure 5:
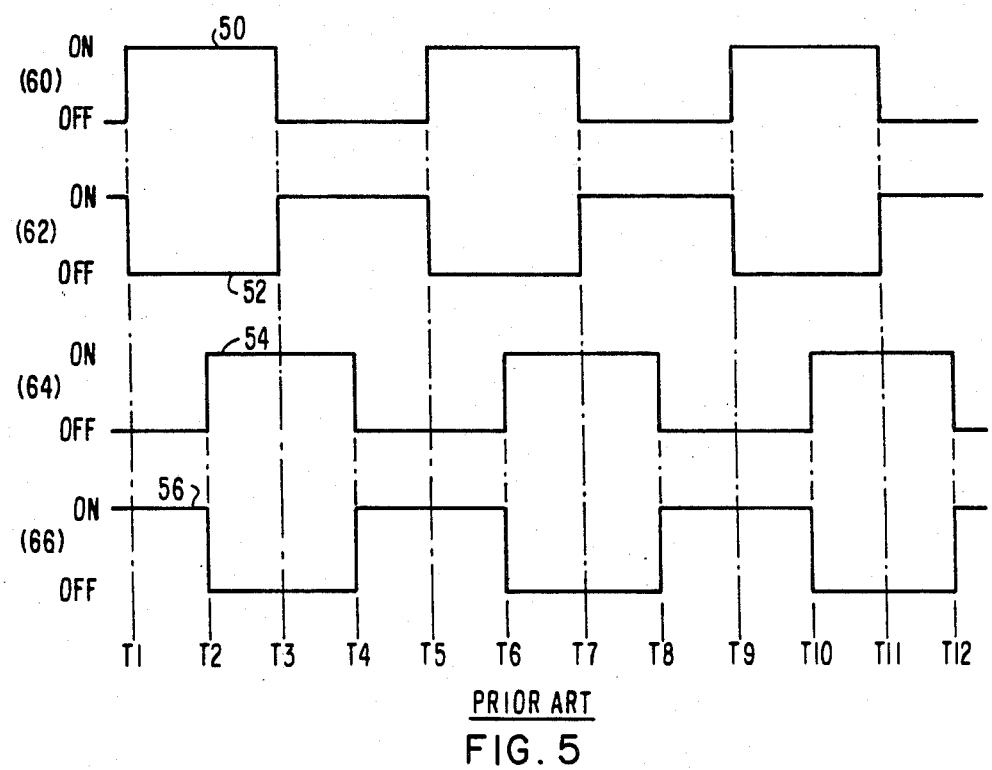
FIG. 5 shows a prior art stepping motor stator coil energization sequence provided for a typical four-pole stepper motor.

In FIG. 5 there is shown a prior art coil energization sequence for a well known four-pole stepper motor. The respective stator coil currents in general follow the illustrated waveforms. Each state change of the energization causes the rotor to incrementally rotate a fixed angle which is dependent on the motor construction, and typically can be 1.8°, 3.6°, 7.5° or 15°. The current wave 50 is ON at time T1 and then goes OFF at time T3 and then goes back ON at time T5 and goes OFF at time T7. The current wave 52 goes OFF at time T1, then goes ON at time T3 and then goes OFF at time T5 and goes ON at time T7. The current wave 54 goes ON at time T1 and goes OFF at time T4, goes ON at time T6 and goes OFF at time T8. The current wave 56 goes OFF at time T2, goes ON at time T4, goes OFF at time T6 and goes ON at time T8.

Figure 6:
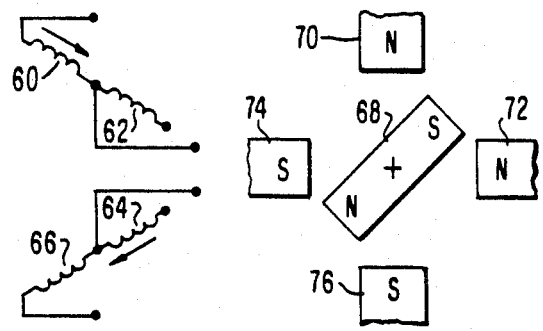
FIGS. 6 through 9 illustrate the successive sequential rotational movement positions of a prior art four-pole stepping motor.
Figure 7:
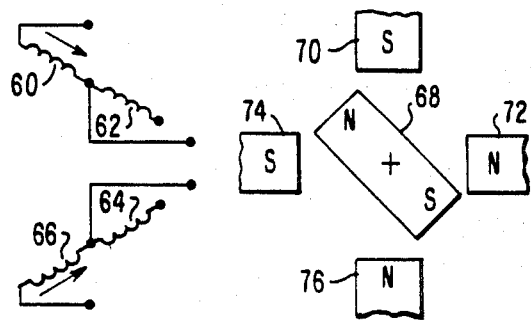
Figure 8:
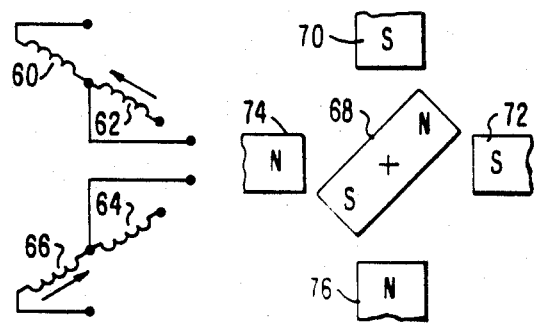
Figure 9:
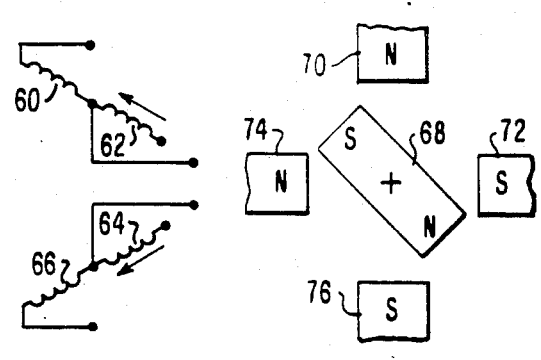

In FIGS. 6, 7, 8 and 9 there is illustrated the sequential rotational movement of the rotor of a prior art four-pole stepping motor. When the field coils 60 and 64 as shown in FIG. 6 are energized at time T2 as shown by the arrows and corresponding to the current wave 50 energizing the field coil 60 and the current wave 54 energizing the field coil 64, the permanent magnet rotor 68 is aligned with the south rotor pole between the two north field poles 70 and 72 and the north rotor pole between the two south field poles 74 and 76. When the field coils 62 and 64 are energized at time T3 as shown by the arrows in FIG. 7, the rotor 68 aligns itself as illustrated with the south rotor pole between the two north field poles 72 and 76 and the north rotor pole between the two south field poles 70 and 74. When the field coils 62 and 66 are energized at time T4 as shown by the arrows in FIG. 8, the rotor 68 moves to the position with the south and north rotor poles as illustrated. When the field coils 60 and 66 are energized at time T5 as shown by the arrows in FIG. 9, the rotor 68 is positioned with the south and north rotor poles as illustrated. When the rotor 68 is again positioned as shown in FIG. 6 the rotor 68 will have rotated through a total of 360°.

Figure 10:
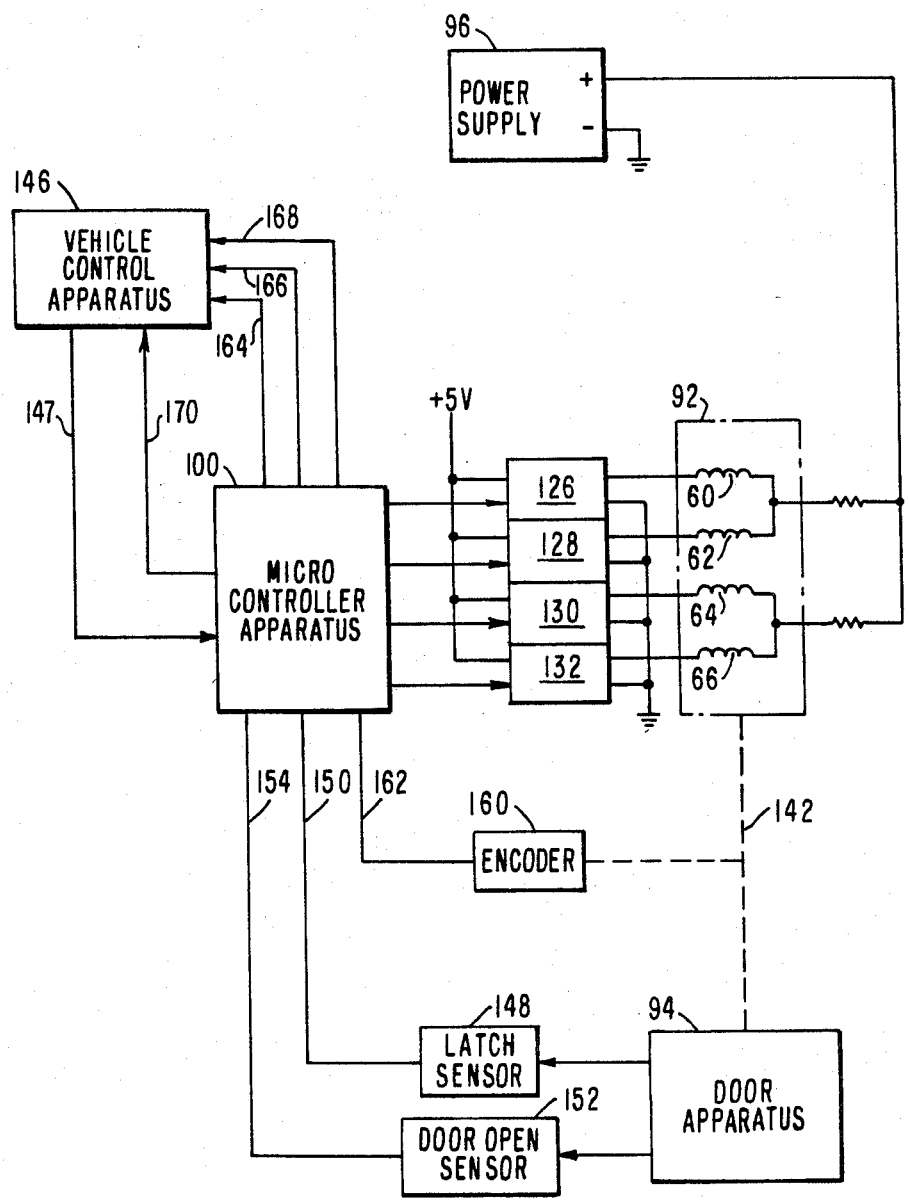
FIG. 10 shows the functional operation of a microprocessor control apparatus in accordance with the present invention coupled with a stepper motor for determining the movement of a load such as a vehicle door apparatus.

FIG. 10 shows the functional operation of a microprocessor control apparatus 100 coupled with a stepper motor 92 and a power supply 96 for determining the movement of the passenger door apparatus 94, such as shown in FIG. 2, and including the microprocessor 100 having a RAM memory for the storage of motor operation control signals and an EPROM memory for the storage of executive and application control programs. The stepper motor 92 has four field coils 60, 62, 64 and 66 and the design of the rotor has many teeth with the design of the field magnetic circuit having corresponding teeth such that by suitable energization of the four field coils 60, 62, 64 and 66 the positional movement of the rotor has a desired number of steps. For the example of 200 steps per revolution, the angular movement of the motor shaft 142 coupled with the door apparatus 94 would provide 1.8° of rotation per step. The microprocessor 100 outputs very low level signals to the solid-state relays 126, 128, 130 and 132 which are the transistor driving circuits energizing the respective stepping motor field coils. When the microprocessor 100 wants the stepping motor 92 to rotate, the microprocessor 100 keeps track of which field coils are energized and then determines what is the next desired operational state as shown in FIG. 4 in order to drive the stepper motor 92 in any particular desired direction and then energizes the proper field coils to provide that next state of operation. When the microprocessor 100 is initially powered on it does not know where the stepper motor 92 and door apparatus 94 are positioned. In order to be able to keep track of where the motor 92 is positioned at all times, the microprocessor 100 will initially start rotating the stepper motor 92 and the motor shaft 142 until the door apparatus 94 reaches a reference position such as closed, and from then on the microprocessor 100 keeps track of how many steps of rotation the motor 92 makes and in which direction or directions such that the present position of the stepper motor 92 and the door apparatus 94 are known.

An operative embodiment of the present invention was made for determining the speed applied to the door apparatus 94 such as operative to open and close the passenger doors of a vehicle or a passenger station. The following apparatus components, available in the open market, were used for the purpose of this embodiment.

| | |
|---|---|
| Motor 92 | Superior Electric M112-FJ-327 52.5 in-#, 2.1 volts, 9.2 amps/phase .242 ohms/phase, 2.1 mh/phase Class B insulation |
| Drive Relays 126, 128, 130 and 132 | Douglas Randall Solid State Relay Model K12B, 12 amp 55 vdc, TTL input |
| Micro Controller 100 | Micromint Z8 Controller with Z8671 single chip micro |
| Power Supply 96 | Sorensen DCR40-40B, 0-50 v, 0-40 amp (set at 24 vdc) |

A well known vehicle control apparatus 146, such as disclosed in the above-referenced published article, can provide a door movement command signal 147 to the microprocessor control apparatus 100 when it is desired for the vehicle door apparatus 94 to open the doors. A latch sensor 148 provides a door latched signal 150 to the microprocessor 100. A door open sensor 152 provides a door open signal 154 to the microprocessor 100. A motor rotation encoder sensor 160 provides a motor rotational movement signal 162 to the microprocessor 100. The microprocessor 100 provides to the vehicle control apparatus 146 a door closed and locked signal 164, a door opened signal 166 and a door obstructed signal 168 in addition to providing suitable energization of the relay drivers 126, 128, 130 and 132 as required to determine the direction and the speed of rotation of the stepper motor 92.

Figures 11, 12:
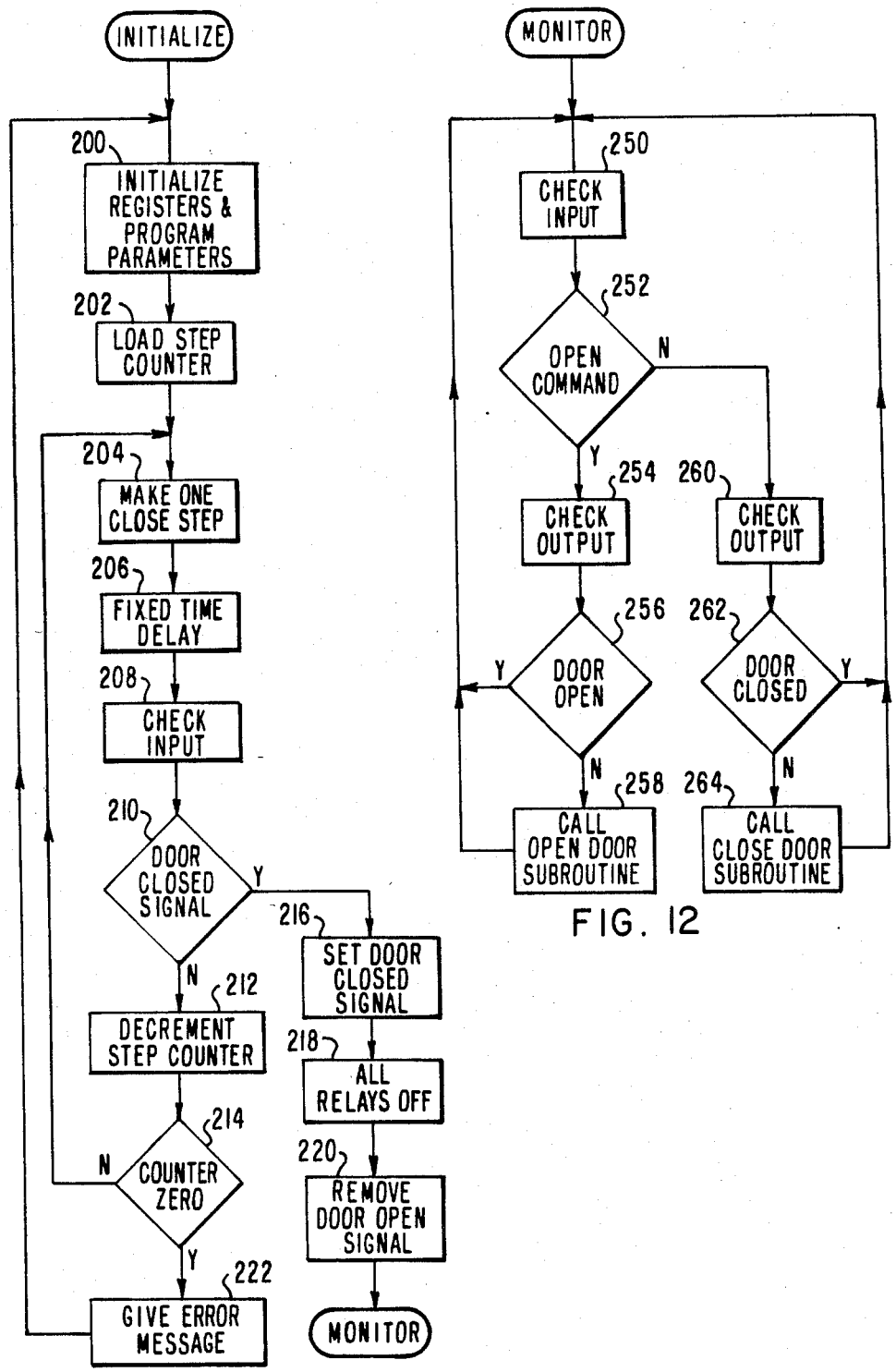
FIG. 11 is a flow chart to illustrate the power up and reset program provided for the microprocessor 100.
FIG. 12 is a flow chart to illustrate the provided monitor program.

The microcontroller software program shown in FIG. 11 powers up and resets the microcontroller 100 and associated control apparatus. The operation consists of driving the door panels shown in FIG. 2 into their closed position in order to identify a known reference location for the stepper motor 92, which is necessary since the door panels 12 and 14 could be in any position when the power is turned on to the control apparatus. The microcontroller 100 registers and the program parameters are initialized at block 200. At block 202 a step counter is loaded with the number of steps desired to move the door from the open to the closed position which, for example, could be 760 steps plus an additional safety margin of 100 steps, depending upon the known actual movement of the door apparatus 94 in relation to each step taken by the motor 92. At block 204 one step of the motor 140 in the closed direction is taken, which is done by selecting the next two motor stator coils to energize as shown in FIGS. 6 to 9 in order to cause the motor 92 to increment in the proper direction. At block 206 an established time delay is then executed, which time delay determines the desired time duration of the control pulses shown in FIG. 5 and the rotational speed of the motor 92 and the speed at which the doors will move in the direction to close. At block 208 the input information is checked. If the door latched signal 150 is not received from the door latch sensor 148 as determined at block 210, at block 212 the step counter is decremented and at block 214 if the counter is not at zero, the program loops back to block 204 and an additional step in the closed direction is taken and this loop operation repeats until the counter reaches zero. The door moves toward the closed position until one of the two operations occur: (1) if the door latch signal 150 is received from the door latch sensor 148, this means the door is in the closed position so at block 216 the door closed signal flag is set and the door closed signal 164 is output, and at block 218 the driver relays 126, 128, 130 and 132 controlling the stepper motor are turned off and the door open signal 166 is removed at block 220, and (2) if the stepper counter reaches zero at block 214 before the door closed signal 150 is received, then the door system is not operating properly so at block 222 an error message 170 is sent out to the vehicle control apparatus 146 and the program returns to block 200 for again initializing the registers and program parameters.

Figure 13:
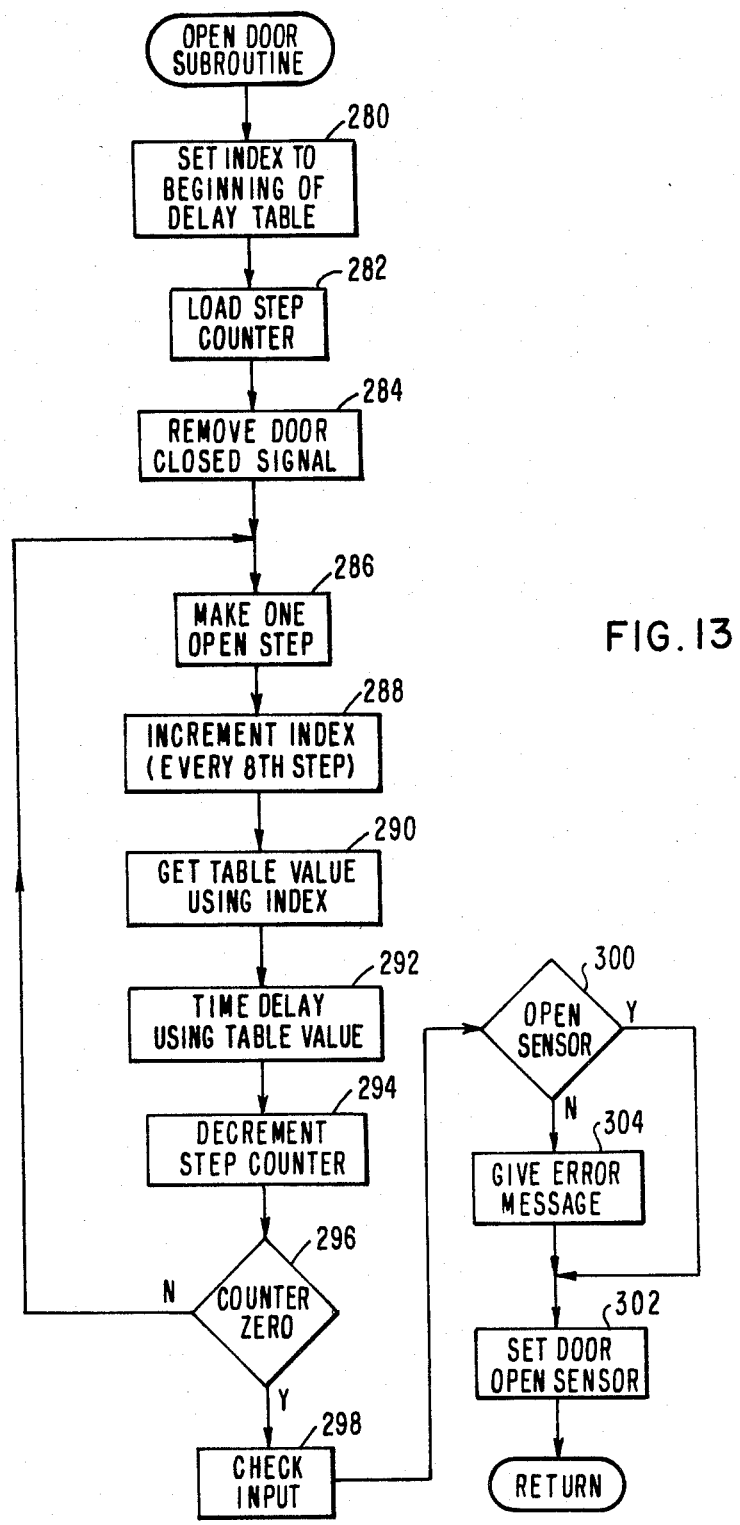
FIG. 13 is a flow chart to illustrate the provided open door subroutine.
Figure 14:
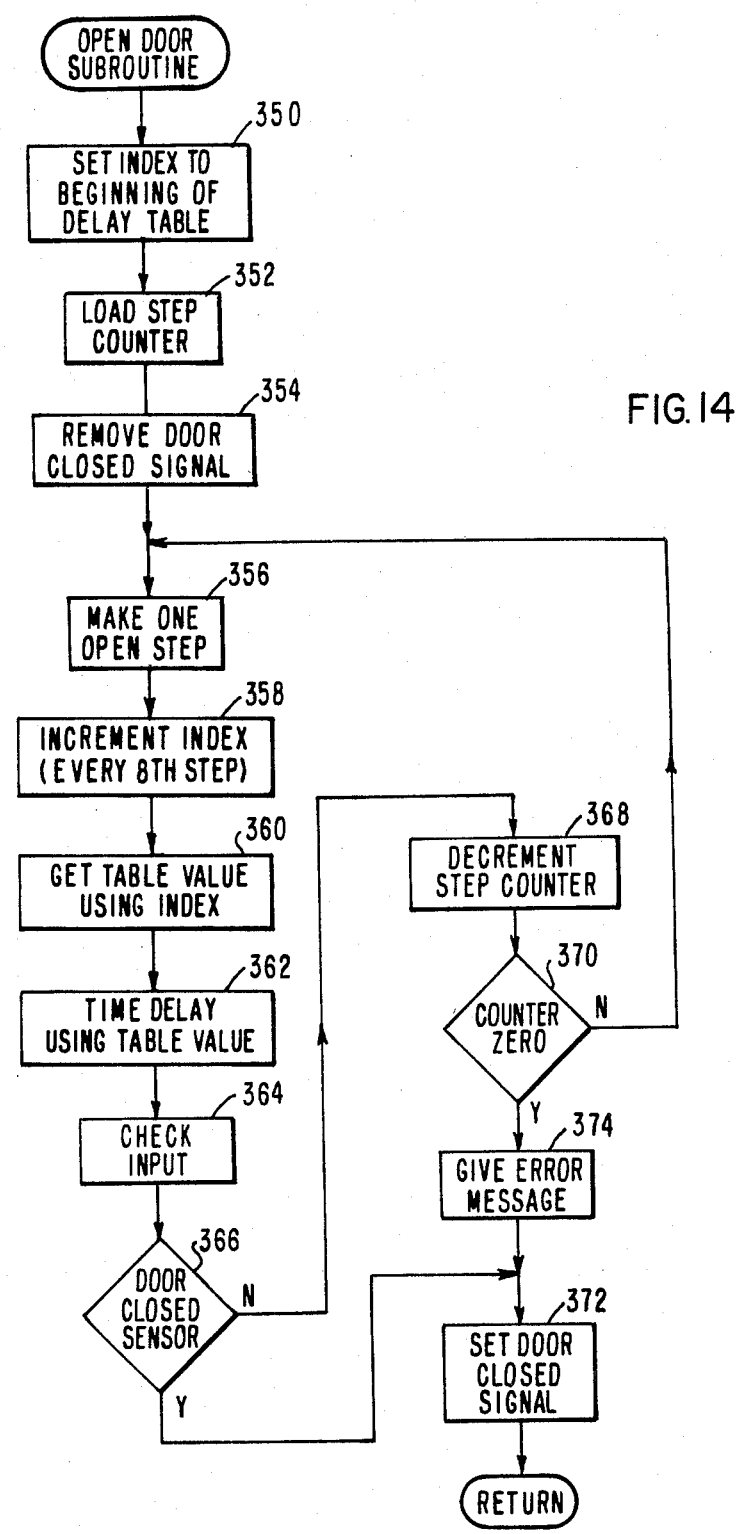
FIG. 14 is a flow chart to illustrate the provided close door subroutine.

When the door is in the closed position at block 210 of FIG. 11, the program operation after block 220 goes into the monitor mode shown in FIG. 12 in which the operation looks for the door movement command signal 147 from the vehicle control apparatus 146 and responds by either opening the door or closing the door. At block 250 the input information signal 154 is checked to see if the door is already in the open position. If the door open command 147 is present at block 252, the program checks the door open sensor output signal 154 at block 254 to see if the door is already in the open position. If the door is in the open position, then the program at block 256 loops back through to the input block 250 until the input information changes. If the door is not already open at block 256, then the open door subroutine is called at block 258 as shown in FIG. 13 for the purpose of opening the doors. If the door command 147 at block 252 is not received, at block 260 a check of the output latch signal 150 is made and if the door is already closed, the program at block 262 loops back to the input of the monitor program. If the door is not closed at block 262, then the door close subroutine at block 264 is called as shown in FIG. 14 for the purpose of closing the doors. After the execution of the door open subroutine shown in FIG. 13 or the door closed subroutine shown in FIG. 14, the program operation loops back into the monitor program shown in FIG. 12.

The open door subroutine shown in FIG. 13 operates to move the door from the closed position to the open position and starts at block 280 by setting an index to the first entry in a table of time delays in accordance with the following table, which is used to establish the ordered time delay pattern of motor stator coil ON information.

TABLE I

| TIMING TABLE IN MEMORY | | | | | | | | |
| --- | --- | --- | --- | --- | --- | --- | --- | --- |
| EE00 | B4AA | 9174 | 5C49 | 3B30 | 2823 | 1E1B | 1816 | 1513 |
| EE10 | 1312 | 1212 | 1212 | 1212 | 1212 | 1212 | 1212 | 1212 |
| EE20 | 1212 | 1212 | 1212 | 1212 | 1212 | 1212 | 1212 | 1212 |
| EE30 | 1212 | 1212 | 1212 | 1212 | 1212 | 1212 | 1212 | 1212 |
| EE40 | 1212 | 1212 | 1212 | 1212 | 1212 | 1212 | 1212 | 1212 |
| EE50 | 1212 | 1212 | 1212 | 1212 | 1212 | 1212 | 1212 | 1212 |
| EE60 | 1212 | 1212 | 1212 | 1212 | 1212 | 1212 | 1212 | 1212 |
| EE70 | 1212 | 1212 | 1212 | 1212 | 1212 | 1212 | 1212 | 1212 |
| EE80 | 1212 | 1212 | 1212 | 1212 | 1212 | 1212 | 1212 | 1212 |
| EE90 | 1212 | 1212 | 1212 | 1212 | 1212 | 1212 | 1212 | 1212 |
| EEA0 | 1212 | 1212 | 1212 | 1212 | 1212 | 1212 | 1212 | 1313 |
| EEB0 | 1516 | 181B | 1E23 | 2830 | 3B49 | 5C74 | 91AA | B4B4 |
| EEC0 | B4B4 | B4B4 | B4B4 | B4B4 | 0000 | 0000 | 0000 | 0000 |
| EED0 | 0000 | 0000 | 0000 | 0000 | 0000 | 0000 | 0000 | 0000 |
| EEE0 | 0000 | 0000 | 0000 | 0000 | 0000 | 0000 | 0000 | 0000 |
| EEF0 | 0000 | 0000 | 0000 | 0000 | 0000 | 0000 | 0000 | 0000 |

Figure 17:
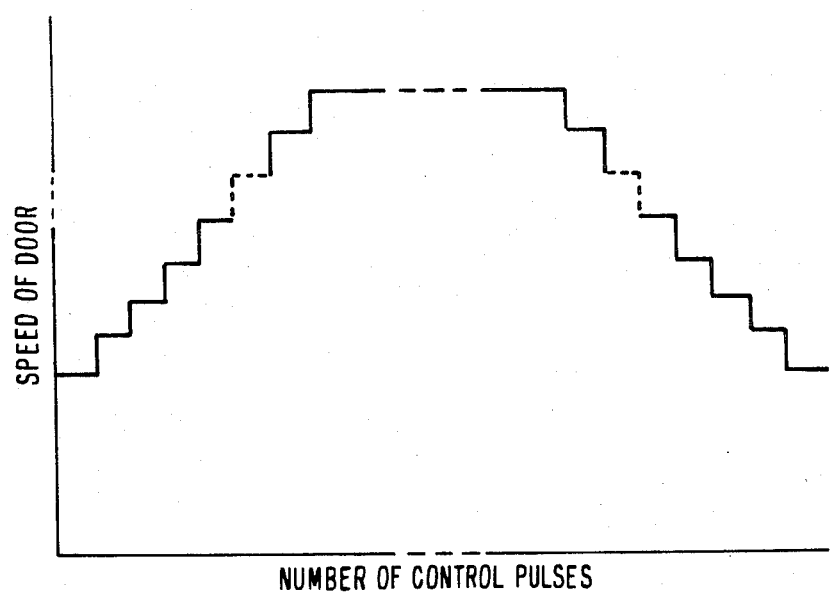
FIG. 17 shows the load speed provided by the control pulse time period modification pattern of FIG. 16.

Each number value in this table determines the time duration between sequential control pulse changes and the resulting stepping motor steps. A high number in hexadecimal corresponds to a long time delay and therefore slower motor speed. The number from the table is loaded into a counter and decremented by the clock of the microprocessor 100 until zero, such that the time delay of the resulting control pulse is established by how long it takes the clock to decrement the stored number. A low number corresponds to a shorter time delay and faster motor speed. The values in the table are selected to alter the door speed in accordance with a desired modified sine wave profile as shown in FIG. 17 and having a predetermined slower start, a slower stop and a higher middle speed. At block 282 the step counter is loaded with the number of motor steps required to go from the closed to the open position, which for one practical application was 760 plus 100 as previously explained. At block 284 the door closed signal 164 is removed and at block 286 the program enters into a loop consisting of making one motor step in the open direction. At block 288 the time delay table index is incremented on every eighth motor step, such that the velocity profile is obtained by providing a different table entry for every eight motor steps to result in a smaller table. A value from the table is retrieved using the index at block 290. At block 292 a time delay period for the next control pulse is executed based on the table value just obtained. At block 294 the step counter is decremented, and this loop will continue to execute until at block 296 the step counter becomes zero. When the step counter becomes zero, the door will be in the open position and at block 298 a check is made of input information signal 154 for the status of the door open sensor 152. If the open signal 154 is found, then the output door open signal 166 is set at block 302 and the program is returned to the monitor. If the open sensor signal 154 is not found at block 300, then an error message signal 170 is sent out at block 304.

The door closed subroutine shown in FIG. 14 consists of setting the index to the first entry in the above table of time delays at block 350, loading the step counter with the previously set forth desired number of steps at block 352 required to go from the open to the closed position plus an additional 100 steps. The door open signal 166 is removed at block 354 and the program enters a loop which consists of making one step in the closed direction at block 356, incrementing the table index every eighth step at block 358, getting the time period value from the table using the index at block 360 and using this value to establish a time delay period for the control pulse at block 362. The input latch signal 150 is checked at block 364 and if the output from the door latch sensor 148 is not found at block 366, the step counter is decremented at block 368, and if the step counter is not zero at block 370, the loop is executed again by returning to block 356. This loop operation will continue until either the signal 150 from the door latch sensor 148 is found at block 366, in which case the door close signal 164 is set at block 372 and the program returns to the monitor, or if the signal 150 from the door latch sensor 156 is not found at block 366, eventually the step counter will be decremented to zero and an error message 170 will be sent out at block 374 indicating an operational problem.

Figure 15:
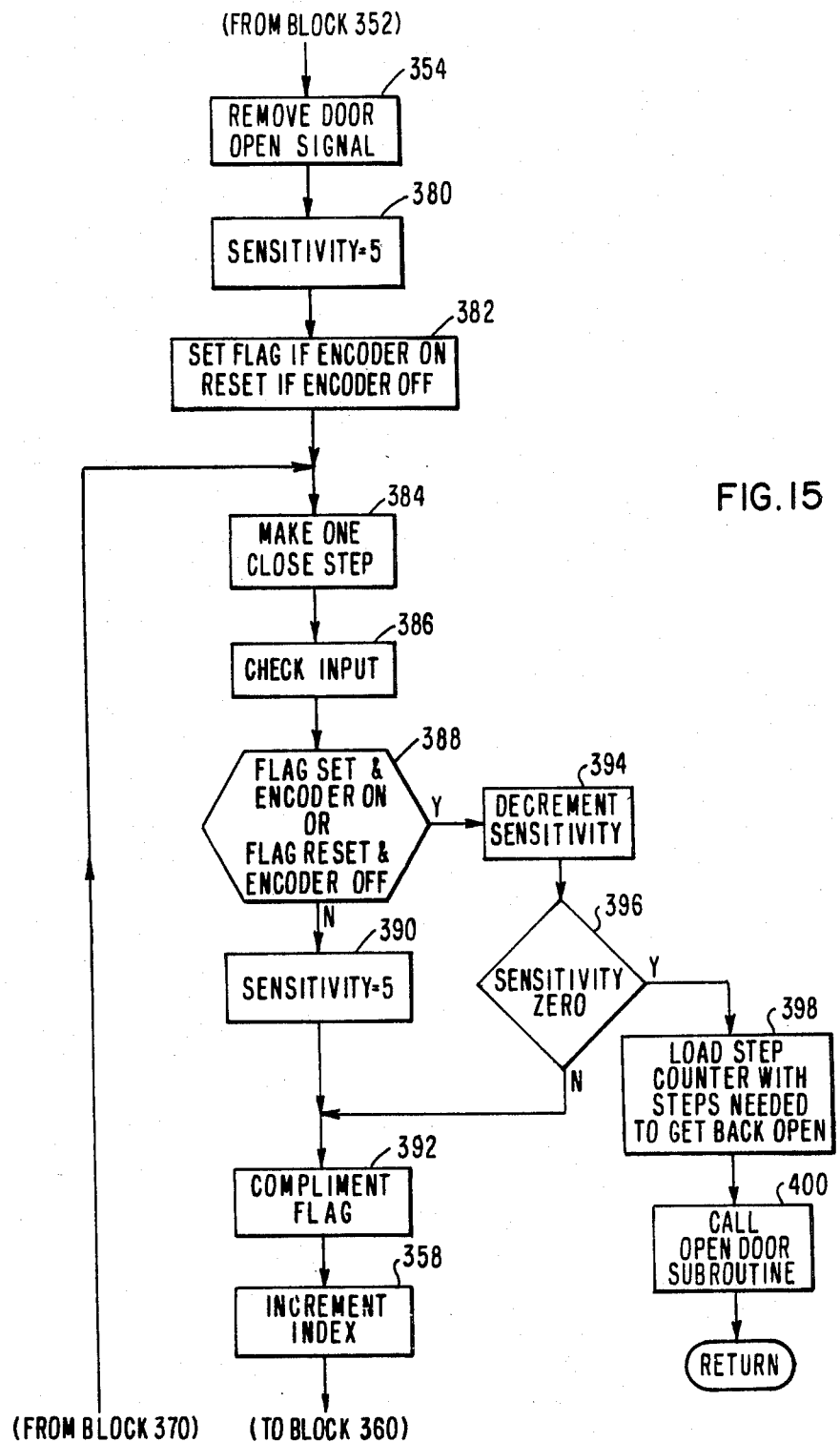
FIG. 15 shows an obstruction sensing modification for the close door subroutine.

A modification of the close door subroutine shown in FIG. 14 is shown in FIG. 15 for the purpose of door movement obstruction sensing. The flow chart shown in FIG. 15 provides a modification to the door close subroutine shown in FIG. 14 to implement the obstruction sensing feature. The effect is to monitor the motor speed encoder 160 connected with the stepper motor shaft 142 as a means of verifying that a motor step has been taken each time a control pulse commands the motor 92 to step. If a number of consecutive missed steps exceeds a predetermined value assigned to the desired sensitivity, then a door movement obstruction is assumed and the doors are reopened. After the door open signal 166 is removed at block 354 of the program shown in FIG. 14, the desired sensitivity is set to a desired number of missed steps, for example 5 at block 380. This number could be made smaller to make the obstruction detection more sensitive or could be made larger to make the detection less sensitive. A flag is then set at block 382, or reset depending upon the state of the encoder, with the flag being set if the encoder is on and reset if the encoder is off. This flag is used to determine if the motor 92 has actually rotated one step after each control pulse commanded the motor 92 to do so. After a close step is taken at block 384, at block 386 the signal 162 from the encoder 160 is input, and at block 388 a check is made to see if the flag is set and the encoder is ON or the flag is reset and the encoder is OFF, for the purpose of step verification. If not, the sensitivity is again set to 5 at block 390 and the flag is complemented at block 392 and the program continues to block 358 to increment table index every eighth step as shown in FIG. 14. If the flag and the encoder operation agree at block 388, the sensitivity is decreased at block 394. A check is made at block 396 to see if the sensitivity has reached zero to indicate 5 consecutive motor missed steps, such that a door obstruction is assumed. At block 398 the step counter is loaded with the number of steps needed to get the doors back open, and at block 400 the open door subroutine shown in FIG. 13 is called and the operation returns to the monitor after that program has run.

The flag is used to determine if the motor has actually rotated one step after it was commanded to do so. After a close step is taken, if the flag and the encoder do not agree at block 388 then the motor is operating correctly. If the flag and the encoder agree at block 388, the sensitivity is decreased since a movement step was missed and if the sensitivity reaches zero after five consecutive motor missed steps, the doors are reopened with a call to the open door subroutine.

Figure 16:
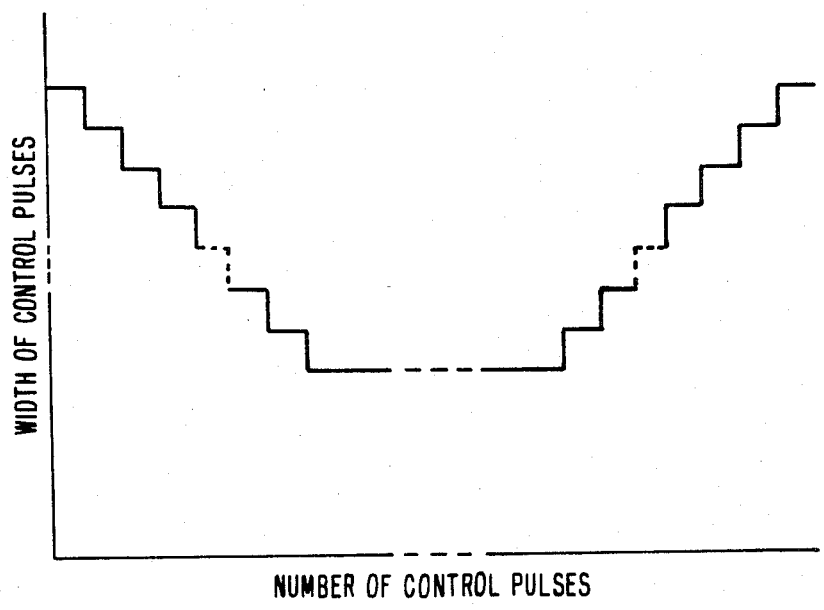
FIG. 16 shows one provided control pulse time period modification pattern for the present invention.

In FIG. 16 there is shown a modified sine wave relationship for the provided control pulse width pattern for controlling the speed of the stepper motor 92 in relation to the provided width of the control pulses as established by the time delay table and a function of the number of control pulses supplied to the motor 92 to open and close the vehicle passenger doors 12 and 14.

In FIG. 17 there is shown the resulting speed profile of the stepper motor 92 in accordance with the control pulse width pattern of FIG. 16.

GENERAL DESCRIPTION OF INSTRUCTION PROGRAM LISTING

In the Appendix there is included an instruction program listing that has been prepared to control an electric motor in accordance with the here-disclosed control system as shown in FIGS. 10 through 18. The instruction program listing is written in assembly language machine code which can be executed on the Z8 microprocessor computer system. This instruction program listing is included to provide an illustration of one suitable embodiment of the present control system for a door control system that has actually been prepared. This instruction program listing at the present time is a more or less development program and has not been extensively debugged through the course of practical operation of vehicles on a transit system. It is well known by persons skilled in this art that real time process control application programs may contain some bugs or minor errors, and it is within the skill of such persons and takes varying periods of actual operation time to identify and routinely correct the more critical of these bugs.

```
0900                          0005      *PROGRAM NAME T0805/SPC
0900                          0010      *SAME AS T0730/SRC BUT WITH HALF STEPS
0900                          0020      *PROGRAM NAME T0805/SRC
0900                          0040      *PROGRAM OPENS & CLOSES DOOR ON COMMAND
0900                          0060      *NEEDS TIMING TABLE LOADED
0900      70   FD             0080      START     PUSH      253
0902      E6   02   FF        0100                LD        2,#255
```

| | | | | | | | |
|---|---|---|---|---|---|---|---|
| 0905 | E6 | F6 | 00 | 0120 | LD | 246,#0 | ;MAKE PORT 2 ALL OUTPUT |
| 0908 | E6 | FD | 30 | 0140 | LD | 253,#48 | |
| 090B | E6 | 22 | 0E | 0160 | LD | 34,#0EH | |
| 090E | E6 | 23 | 00 | 0180 | LD | 35,#00H | |
| 0911 | E6 | 24 | 06 | 0200 | LD | 36,#06H | |
| 0914 | E6 | 25 | 00 | 0220 | LD | 37,#00H | |
| 0917 | E6 | 26 | AF | 0240 | LD | 38,#175 | |
| 091A | E6 | 27 | EF | 0245 | LD | 39,#239 | |
| 091D | E6 | 28 | 6F | 0260 | LD | 40,#111 | |
| 0920 | E6 | 29 | 7F | 0270 | LD | 41,#127 | |
| 0923 | E6 | 2A | 5F | 0280 | LD | 42,#95 | |
| 0926 | E6 | 2B | DF | 0300 | LD | 43,#223 | |
| 0929 | E6 | 2C | 9F | 0320 | LD | 44,#159 | |
| 092C | E6 | 2D | BF | 0340 | LD | 45,#191 | |
| 092F | E6 | 2E | 26 | 0360 | LD | 46,#38 | |
| 0932 | | | | 0400 | ************************ | | |
| 0932 | E4 | 24 | 34 | 0420 | LD | 52,36 | |
| 0935 | E4 | 25 | 35 | 0440 | LD | 53,37 | |
| 0938 | A0 | E4 | | 0460 | INCW | RR4 | |
| 093A | A0 | E4 | | 0480 | INCW | RR4 | |
| 093C | A0 | E4 | | 0500 | INCW | RR4 | |
| 093E | A0 | E4 | | 0520 | INCW | RR4 | |
| 0940 | A0 | E4 | | 0540 | INCW | RR4 | |
| 0942 | A0 | E4 | | 0560 | INCW | RR4 | |
| 0944 | A0 | E4 | | 0580 | INCW | RR4 | |
| 0946 | E6 | 2F | 08 | 0600 | LD | 47,#8 | |
| 0949 | D6 | 0A | 58 | 0620 | INIT CALL | NEXCL | |
| 094C | 09 | 02 | | 0640 | LD | 2,R0 | |
| 094E | AC | B4 | | 0660 | LD | R10,#180 | |
| 0950 | D6 | 0A | 1C | 0680 | CALL | DELAY | |
| 0953 | D6 | 0A | 15 | 0700 | CALL | INPUT | |
| 0956 | 66 | E9 | 40 | 0720 | TCM | R9,#64 | |
| 0959 | EB | 0B | | 0740 | JR | NZ,INIEX | |
| 095B | 80 | E4 | | 0760 | DECW | RR4 | |
| 095D | EB | EA | | 0780 | JR | NZ,INIT | |
| 095F | D6 | 0A | E8 | 0800 | CALL | MESG1 | |
| 0962 | 50 | FD | | 0820 | POP | 253 | |
| 0964 | 8B | 9A | | 0840 | JR | START | |
| 0966 | E6 | 02 | FE | 0860 | INIEX LD | 2,#254 | |
| 0969 | | | | 0880 | ************************ | | |
| 0969 | D6 | 0A | 15 | 0900 | MONIT CALL | INPUT | |
| 096C | 66 | E9 | 01 | 0920 | TCM | R9,#1 | |
| 096F | EB | 1D | | 0940 | JR | NZ,MONEX | |
| 0971 | 66 | E9 | 80 | 0960 | TCM | R9,#128 | |
| 0974 | 6B | 0C | | 0980 | JR | Z,CLOSQ | |
| 0976 | A8 | 02 | | 1000 | LD | P10,2 | |
| 0978 | 66 | EA | 04 | 1020 | TCM | R10,#4 | |
| 097B | EB | EC | | 1040 | JR | NZ,MONIT | |
| 097D | DB | 08 | 91 | 1050 | CALL | OPEN | |
| 0980 | 8B | E2 | | 1080 | JR | MONIT | |
| 0982 | A8 | 02 | | 1100 | CLOSQ LD | R10,2 | |
| 0984 | 66 | EA | 01 | 1120 | TCM | R10,#1 | |
| 0987 | EB | E0 | | 1140 | JR | NZ,MONIT | |
| 0989 | D6 | 09 | CC | 1160 | CALL | CLOSE | |
| 098C | 8B | DB | | 1180 | JR | MONIT | |
| 098E | 50 | FD | | 1200 | MONEX POP | 253 | |
| 0990 | AF | | | 1220 | RET | | |
| 0991 | | | | 1240 | ************************ | | |
| 0991 | 70 | FD | | 1260 | OPEN PUSH | 253 | |
| 0993 | E6 | FD | 30 | 1280 | LD | 253,#48 | |
| 0996 | E4 | 22 | 32 | 1300 | LD | 50,34 | ;SET TABLE INDEX |
| 0999 | E4 | 23 | 33 | 1320 | LD | 51,35 | ;TO FIRST ENTRY |
| 099C | 80 | 32 | | 1340 | DECW | 50 | |
| 099E | E4 | 24 | 34 | 1360 | LD | 52,36 | ;SET MOTOR STEP COUNT |
| 09A1 | E4 | 25 | 35 | 1380 | LD | 53,37 | |
| 09A4 | E6 | 02 | FF | 1400 | LD | 2,#255 | |
| 09A7 | E6 | 2F | 08 | 1420 | LD | 47,#8 | |
| 09AA | D6 | 0A | 3F | 1440 | NOE0 CALL | NEXOP | |
| 09AD | 09 | 02 | | 1460 | LD | 2,R0 | |
| 09AF | D6 | 0A | 72 | 1480 | CALL | TABIN | |
| 09B2 | C2 | A2 | | 1500 | LDC | R10,@RR2 | ;GET BYTE FROM TABLE |
| 09B4 | D6 | 0A | 1C | 1520 | CALL | DELAY | |
| 09B7 | 80 | E4 | | 1540 | DECW | RR4 | |
| 09B9 | EB | EF | | 1560 | JR | NZ,NOE0 | |
| 09BB | D6 | 0A | 15 | 1580 | CALL | INPUT | |
| 09BE | 66 | E9 | 20 | 1600 | TCM | R9,#32 | |
| 09C1 | 6B | 03 | | 1620 | JR | Z,CONT1 | |
| 09C3 | D6 | 0A | F3 | 1640 | CALL | MESG2 | |
| 09C6 | E6 | 02 | FB | 1660 | CONT1 LD | 2,#251 | |
| 09C9 | 50 | FD | | 1680 | POP | 253 | |
| 09CB | AF | | | 1700 | RET | | |
| 09CC | | | | 1720 | ************************ | | |

| | | | | | | | |
|---|---|---|---|---|---|---|---|
| 09CC | 70 | FD | | 1740 | CLOSE | PUSH | 253 |
| 09CE | E6 | FD | 30 | 1760 | | LD | 253,#48 |
| 09D1 | E4 | 22 | 32 | 1780 | | LD | 50,34 | ;SET TABLE INDEX |
| 09D4 | E4 | 23 | 33 | 1800 | | LD | 51,35 | ;TO FIRST ENTRY |
| 09D7 | 80 | 32 | | 1820 | | DECW | 50 |
| 09D9 | E4 | 24 | 34 | 1840 | | LD | 52,36 | ;SET MOTOR STEP COUNT |
| 09DC | E4 | 25 | 35 | 1860 | | LD | 53,37 |
| 09DF | A0 | E4 | | 1880 | | INCW | RR4 |
| 09E1 | A0 | E4 | | 1900 | | INCW | RR4 |
| 09E3 | A0 | E4 | | 1920 | | INCW | RR4 |
| 09E5 | A0 | E4 | | 1940 | | INCW | RR4 |
| 09E7 | A0 | E4 | | 1960 | | INCW | RR4 |
| 09E9 | A0 | E4 | | 1980 | | INCW | RR4 |
| 09EP | A0 | E4 | | 2000 | | INCW | RR4 |
| 09ED | E6 | 02 | FF | 2020 | | LD | 2,#255 |
| 09F0 | E6 | 2F | 08 | 2040 | | LD | 47,#8 |
| 09F3 | D6 | 0A | 58 | 2060 | CL0 | CALL | NEXCL |
| 09F6 | 09 | 02 | | 2080 | | LD | 2,R0 |
| 09F8 | D6 | 0A | 72 | 2100 | | CALL | TABINC |
| 09FB | C2 | A2 | | 2120 | | LDC | R10,@RR2 | ;GET BYTE FROM TABLE |
| 09FD | D6 | 0A | 1C | 2140 | | CALL | DELAY |
| 0A00 | D6 | 0A | 15 | 2160 | | CALL | INPUT |
| 0A03 | 66 | E9 | 40 | 2180 | | TCM | R9,#64 |
| 0A06 | EP | 07 | | 2200 | | JR | NZ,CLEX |
| 0A08 | 80 | E4 | | 2220 | | DECW | RR4 |
| 0A0A | EP | E7 | | 2240 | | JR | NZ,CL0 |
| 0A0C | D6 | 0A | FE | 2260 | | CALL | MESG3 |
| 0A0F | E6 | 02 | FE | 2280 | CLEX | LD | 2,#254 |
| 0A12 | 50 | FD | | 2300 | | POP | 253 |
| 0A14 | AF | | | 2320 | | RET |
| 0A15 | | | | 2340 | ************************ |
| 0A15 | EC | FF | | 2360 | INPUT | LD | R14,#255 |
| 0A17 | FC | FD | | 2380 | | LD | R15,#253 |
| 0A19 | 02 | 9E | | 2400 | | LDC | R9,@PR14 |
| 0A1P | AF | | | 2420 | | RET |
| 0A1C | | | | 2440 | ************************ |
| 0A1C | 70 | EA | | 2460 | DELAY | PUSH | R10 |
| 0A1E | AC | 01 | | 2480 | | LD | R10,#1 |
| 0A20 | PC | 05 | | 2500 | | LD | R11,#5 |
| 0A22 | 80 | EA | | 2520 | TIME0 | DECW | R10 |
| 0A24 | EB | FC | | 2540 | | JR | NZ,TIME0 |
| 0A26 | 50 | EA | | 2560 | | POP | R10 |
| 0A28 | 00 | EA | | 2580 | TIME1 | DEC | R10 |
| 0A2A | E4 | 3F | 3E | 2600 | | LD | 62,63 |
| 0A2D | E4 | 3F | 3E | 2620 | | LD | 62,63 |
| 0A30 | E4 | 3F | 3E | 2640 | | LD | 62,63 |
| 0A33 | E4 | 3F | 3E | 2660 | | LD | 62,63 |
| 0A36 | E4 | 3F | 3E | 2680 | | LD | 62,63 |
| 0A39 | E4 | 3F | 3E | 2700 | | LD | 62,63 |
| 0A3C | EB | EA | | 2720 | | JR | NZ,TIME1 |
| 0A3E | AF | | | 2740 | | RET |
| 0A3F | | | | 2760 | ************************ |
| 0A3F | 70 | FD | | 2780 | NEXOP | PUSH | 253 |
| 0A41 | E6 | FD | 20 | 2800 | | LD | 253,#32 |
| 0A44 | EE | | | 2820 | | INC | R14 |
| 0A45 | A6 | EE | 2E | 2840 | | CP | R14,#46 |
| 0A48 | 6P | 04 | | 2860 | | JR | Z,NO1 |
| 0A4A | F0 | 21 | | 2880 | | SWAP | 33 |
| 0A4C | 8B | 04 | | 2900 | | JR | NO2 |
| 0A4E | EC | 26 | | 2920 | NO1 | LD | R14,#38 |
| 0A50 | 8B | 00 | | 2940 | | JR | NO2 |
| 0A52 | E5 | 2E | 30 | 2960 | NO2 | LD | 48,@46 |
| 0A55 | 50 | FD | | 2980 | | POP | 253 |
| 0A57 | AF | | | 3000 | | RET |
| 0A58 | | | | 3020 | ************************ |
| 0A58 | 70 | FD | | 3040 | NEXCL | PUSH | 253 |
| 0A5A | E6 | FD | 20 | 3060 | | LD | 253,#32 |
| 0A5D | 00 | EE | | 3080 | | DEC | R14 |
| 0A5F | A6 | EE | 25 | 3100 | | CP | P14,#37 |
| 0A62 | 6P | 04 | | 3120 | | JR | Z,NO3 |
| 0A64 | F0 | 21 | | 3140 | | SWAP | 33 |
| 0A66 | SP | 04 | | 3160 | | JR | NO4 |
| 0A68 | EC | 2D | | 3180 | NO3 | LD | R14,#45 |
| 0A6A | 8B | 00 | | 3200 | | JR | NO4 |
| 0A6C | E5 | 2E | 30 | 3220 | N04 | LD | 48,@46 |
| 0A6F | 50 | FD | | 3240 | | POP | 253 |
| 0A71 | AF | | | 3260 | | RET |
| 0A72 | | | | 3280 | ************************ |
| 0A72 | 00 | 2F | | 3300 | TABIN | DEC | 47 |
| 0A74 | EP | 07 | | 3320 | | JR | NZ,TAP1 |
| 0A76 | E6 | 2F | 08 | 3340 | | LD | 47,#8 |
| 0A79 | A0 | 32 | | 3360 | | INCW | 50 |

-continued

| | | | | | | | | |
|---|---|---|---|---|---|---|---|---|
| 0A7B | 8P | 09 | | | | 3380 | | JR | TAB2 |
| 0A7D | E4 | 3F | 3E | | | 3400 | TAB1 | LD | 62,63 |
| 0A80 | E4 | 3F | 3E | | | 3420 | | LD | 62,63 |
| 0A83 | E4 | 3F | 3E | | | 3440 | | LD | 62,63 |
| 0A86 | AF | | | | | 3460 | TAB2 | RET | |
| 0A87 | 43 | 41 | 4E | 10 | 4E | 3480 | MES1 | DB | 'CAN NOT FIND INITIAL CLOSED POSITION |
| .0DH | 4F | 54 | 20 | 45 | 4F | | | | |
| | 4E | 44 | 20 | 49 | 4E | | | | |
| | 49 | 54 | 49 | 41 | 4C | | | | |
| | 20 | 43 | 4C | 4F | 53 | | | | |
| | 45 | 44 | 20 | 50 | 4F | | | | |
| | 53 | 49 | 54 | 49 | 4F | | | | |
| | 4E | 0D | | | | | | | |
| 0AAC | 43 | 41 | 4E | 20 | 4E | 3500 | MES2 | DB | 'CAN NOT FIND OPEN SENSOR',0DH |
| | 4F | 54 | 20 | 45 | 4F | | | | |
| | 4E | 44 | 20 | 4F | 50 | | | | |
| | 45 | 4E | 20 | 53 | 45 | | | | |
| | 4E | 53 | 4F | 52 | 0D | | | | |
| 0AC5 | 49 | 20 | 41 | 4D | 20 | 3520 | MES3 | DB | 'I AM HAVING TROUBLE GETTING CLOSED' |
| 0DH | | | | | | | | | |
| | 48 | 41 | 56 | 49 | 4E | | | | |
| | 47 | 20 | 54 | 52 | 4F | | | | |
| | 55 | 42 | 40 | 45 | 20 | | | | |
| | 4E | 47 | 20 | 43 | 4C | | | | |
| | 4F | 53 | 45 | 44 | 00 | | | | |
| 0AE8 | 70 | FD | | | | 3540 | MESG1 | PUSH | 253 |
| 0AEA | E6 | FD | 10 | | | 3560 | | LD | 253,#16 |
| 0AED | 0C | 0A | | | | 3580 | | LD | R0,#MES1!H |
| 0AEF | 1C | 87 | | | | 3600 | | LD | R1,#MES1!L |
| 0AF1 | 8B | 14 | | | | 3620 | | JR | SET |
| 0AF3 | 70 | FD | | | | 3640 | MESG2 | PUSH | 253 |
| 0AF5 | E6 | FD | 10 | | | 3660 | | LD | 253,#16 |
| 0AF8 | 0C | 0A | | | | 3680 | | LD | R0,#MES2!H |
| 0AFA | 1C | AC | | | | 3700 | | LD | R1,#MES2!L |
| 0AFC | 8B | 09 | | | | 3720 | | JR | SET |
| 0AFE | 70 | FD | | | | 3740 | MESG3 | PUSH | 253 |
| 0B00 | E6 | FD | 10 | | | 3760 | | LD | 253,#16 |
| 0P03 | 0C | 0A | | | | 3780 | | LD | R0,#MES3!H |
| 0P05 | 1C | C5 | | | | 3800 | | LD | R1,#MES3!L |
| 0B07 | C2 | 30 | | | | 3820 | SET | LDC | R3,@RR0 |
| 0B09 | D6 | 00 | 61 | | | 3840 | | CALL | #61H |
| 0B0C | A6 | E3 | 0D | | | 3860 | | CP | R3,#0DH |
| 0B0F | 6B | 04 | | | | 3880 | | JR | Z,MEX |
| 0B11 | A0 | E0 | | | | 3900 | | INCW | R0 |
| 0B13 | 8B | F2 | | | | 3920 | | JR | SET |
| 0P15 | 50 | FD | | | | 3940 | MEX | POP | 253 |
| 0P17 | AF | | | | | 3960 | | RET | |

SYMBOL TABLE

| | | | | | | | | |
|---|---|---|---|---|---|---|---|---|
| CL0 | 09F3 | CLEX | 0A0F | CLOSE | 09CC | CLOSQ | 0982 | CONT1 | 09C6 |
| DELAY | 0A1C | INIEX | 0966 | INIT | 0949 | INPUT | 0A15 | MES1 | 0A87 |
| MES2 | 0AAC | MES3 | 0AC5 | MESG1 | 0AE8 | MESG2 | 0AF3 | MESG3 | 0AFE |
| MEX | 0B15 | MONEX | 098E | MONIT | 0969 | NEXCL | 0A58 | NEXOP | 0A3F |
| NO1 | 0A4E | NO2 | 0A52 | NO3 | 0A68 | NO4 | 0A6C | NOE0 | 09AA |
| OPEN | 0991 | SET | 0B07 | START | 0900 | TAB1 | 0A7D | TAB2 | 0A86 |
| TABIN | 0A72 | TIME0 | 0A22 | TIME1 | 0A28 | | | | |

I claim:

1. In door movement control apparatus for providing movement of at least one door to a desired position in accordance with an input movement request signal and providing a desired speed pattern for that movement, the combination of stepper motor means coupled with the door for moving the load in at least one direction, sensor means coupled with the door for providing a door movement indicating signal, and means coupled with said stepping motor and responsive to said movement request signal for providing a predetermined number of control pulses to energize the stepping motor for providing a movement of said door in said one direction, with the control pulse providing means being responsive to the door movement indicating signal and including a memory containing a desired time delay to determine a motor step taken in response to each control pulse and having a time duration established as a function of the number of control pulses previously provided to the stepper motor for moving the door in said one direction and to establish said desired speed pattern.

2. The door movement control apparatus of claim 1, with the control pulse providing means including a counter operative to count the number of motor steps taken in response to said control pulses.

3. The door movement control apparatus of claim 1, with the control pulse providing means being responsive to one of the number of motor steps taken or the provision of the door movement indicating signal for establishing that the door movement in said one direction is complete.

4. The door movement control apparatus of claim 1, with the input movement request signal selecting a movement of the door in one of a first direction and a second direction, said control pulse providing means being responsive to the movement request signal for following a first predetermined operation when moving the door in said first direction and for following a second predetermined operation when moving the door in said second direction, and with each of the first and second predetermined operations including a desired pattern of different time delays for the respective control pulses as a function of said number of control pulses.

5. The door movement control apparatus of claim 1,
with the sensor means providing a door movement indicating signal for each motor step taken in response to a control pulse, and with the control pulse providing means comparing the number of motor steps taken with the number of control pulses provided to establish when a motor step is not taken in response to a control pulse.

6. In a door movement control method for providing one of an opening direction movement and a closing direction movement of a door coupled with a stepper motor and responsive to a movement request signal, the steps of providing control pulses to said motor in response to said movement request signal for energizing the motor to take a step for each control pulse, establishing a predetermined movement of the door for each step taken by said motor, providing a movement indicating signal for each predetermined movement of the door, and comparing the number of said provided control pulses with the number of said provided movement indicating signals to determine when a motor step is taken in response to a control pulse.

7. The door movement control method of claim 6,
with said movement request signal selecting said closing direction movement, and with said comparing of the control pulses and the indicating signals being operative to determine that the door closing direction movement is obstructed.

8. The door movement control method of claim 6, including providing desired time delays for the respective steps taken by said motor in response to the control pulses, establishing an index entry to said desired time delays in relation to each of the opening direction movements and the closing direction movements of said door such that a predetermined number of such movements is provided for each movement direction.

* * * * *